Nov. 20, 1945.  M. P. WINTHER  2,389,572

ENGINE LOADING AND TESTING SYSTEM

Filed Aug. 11, 1943  3 Sheets-Sheet 1

Martin P. Winther,
Inventor.
Haynes and Koenig
Attorneys.

Nov. 20, 1945.    M. P. WINTHER    2,389,572
ENGINE LOADING AND TESTING SYSTEM
Filed Aug. 11, 1943    3 Sheets-Sheet 2

Nov. 20, 1945.	M. P. WINTHER	2,389,572
ENGINE LOADING AND TESTING SYSTEM
Filed Aug. 11, 1943	3 Sheets-Sheet 3

Martin P. Winther,
Inventor.
Haynes and Koenig,
Attorneys.

Patented Nov. 20, 1945

2,389,572

UNITED STATES PATENT OFFICE 2,389,572

ENGINE LOADING AND TESTING SYSTEM

Martin P. Winther, Waukegan, Ill., assignor to Martin P. Winther, as trustee

Application August 11, 1943, Serial No. 498,155

5 Claims. (Cl. 73—134)

This invention relates to an engine loading and testing system and with regard to certain more specific features, to electrical power recovery means for such a system.

Among the several objects of the invention may be noted the provision of an improvement upon known synchronous-generator power-recovery systems for engine test purposes, in which improvement a dynamometer form of slip coupling is used which will enable loading and testing of an engine for power output and other purposes from practically any low speed up to and beyond the synchronous speed of the generator; the provision of a device of the class described with which the engine may be electrically driven and tested for certain purposes; and the provision of apparatus of this class which is very flexible in application, whereby various engine test factors may be easily determined, either with full accuracy, or such approximate accuracy as may be deemed sufficient. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

Figure 1:
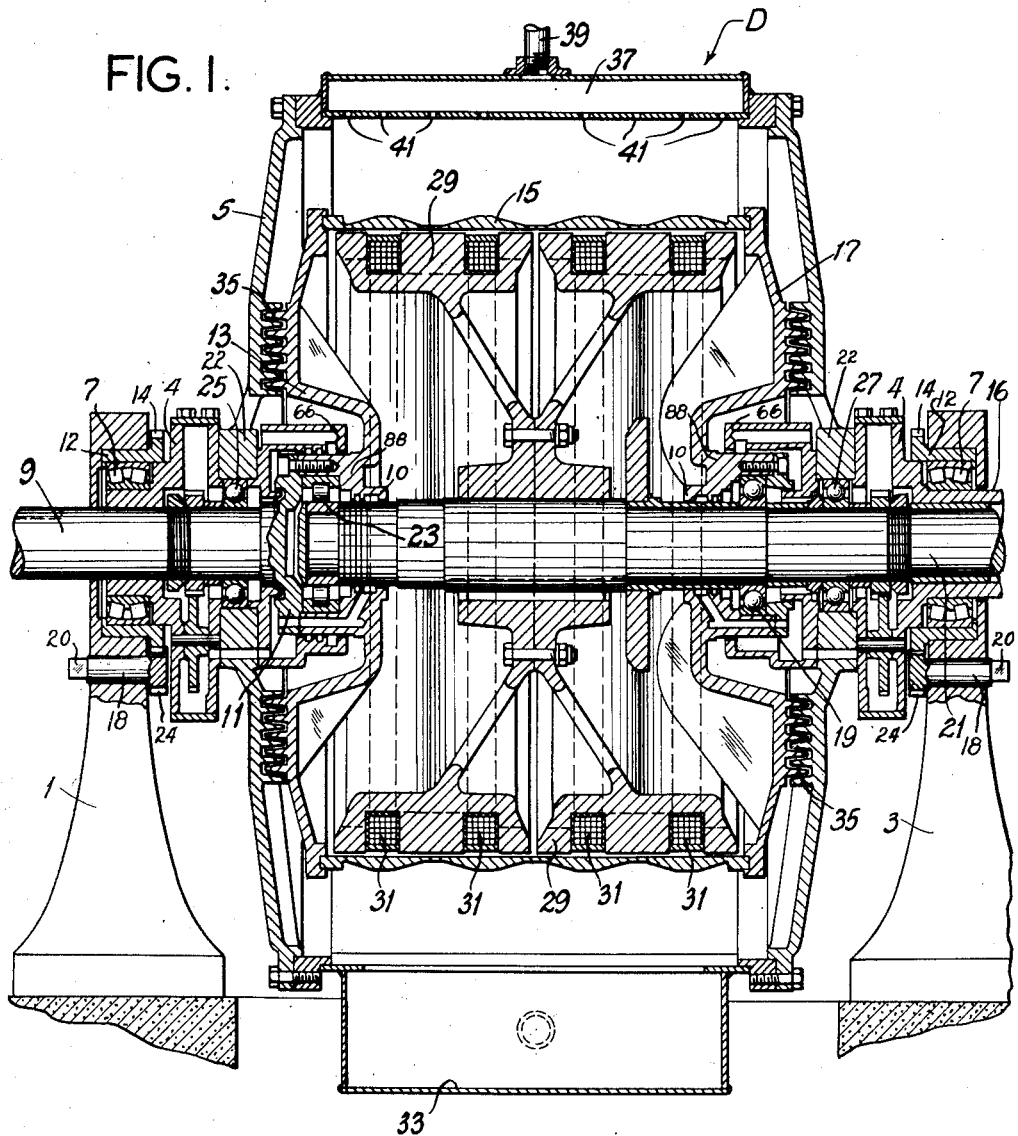
Figure 2:
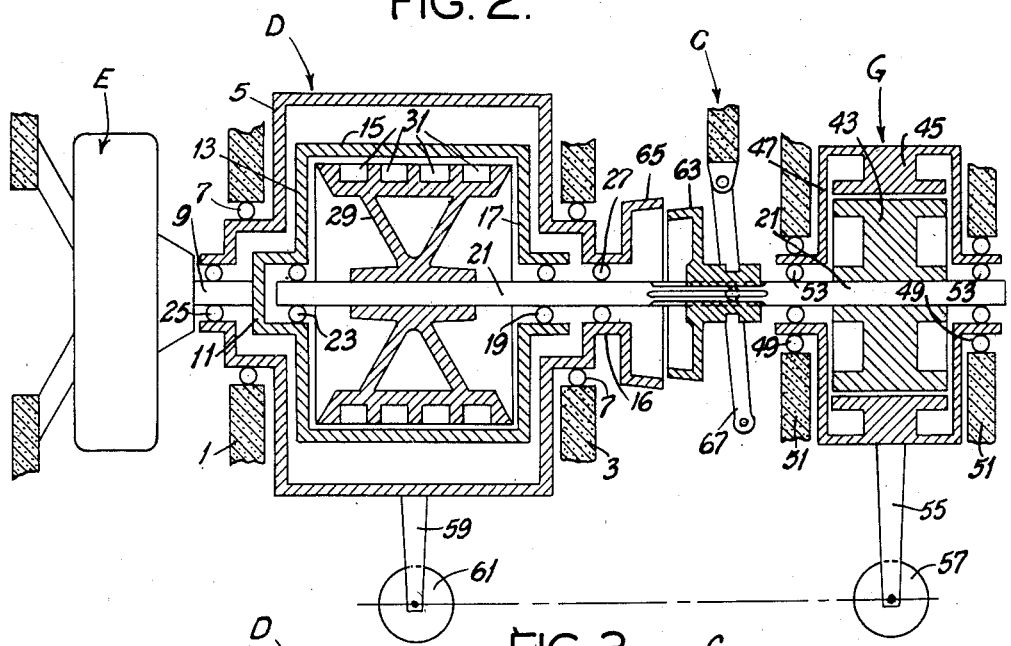
Figure 3:
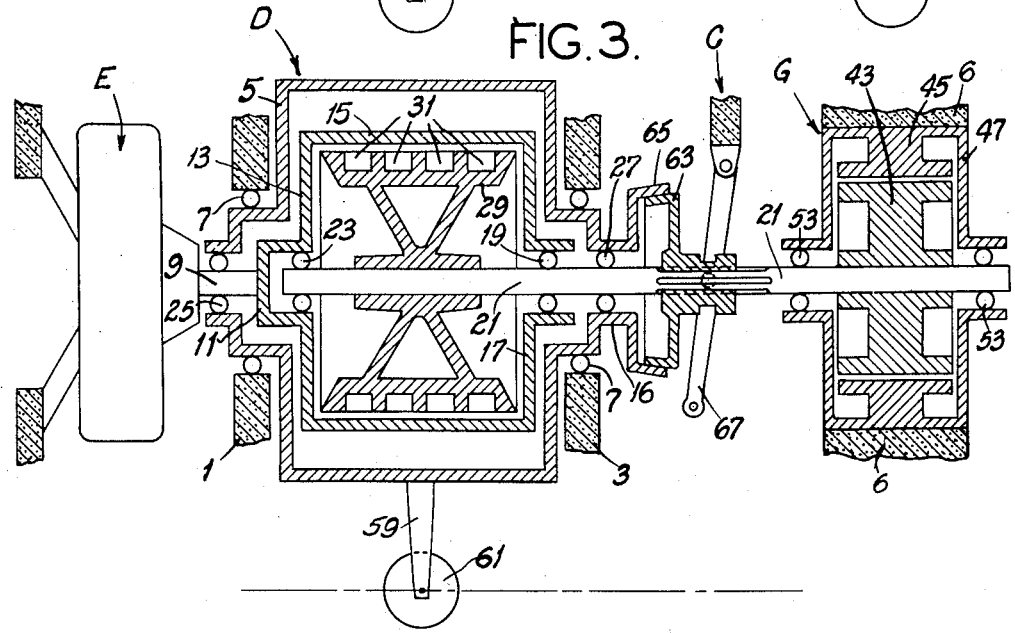
Figure 4:
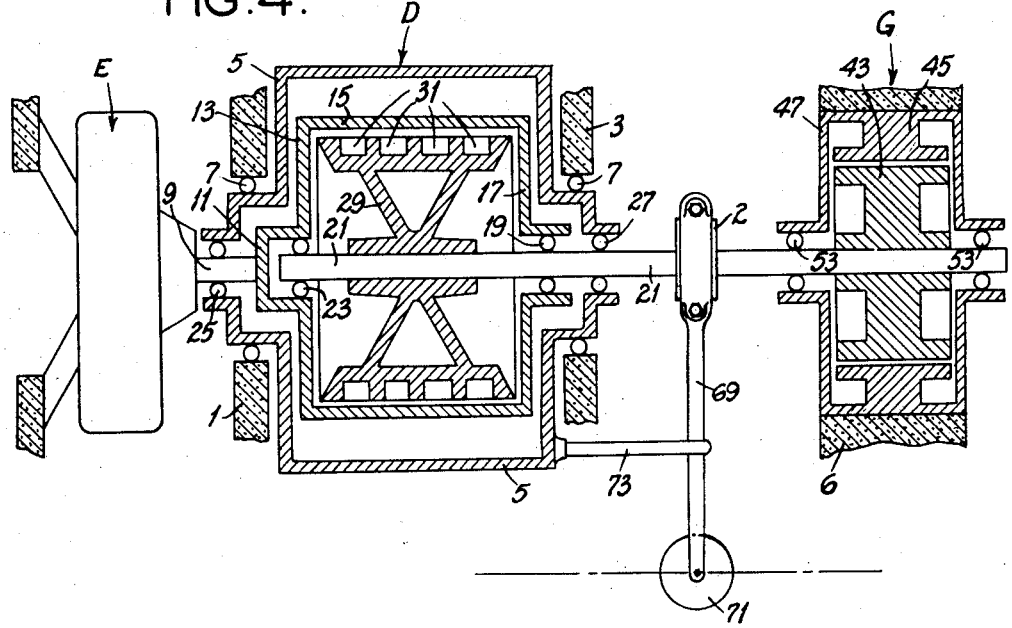

In the accompanying drawings, in which are ilustrated several of various possible embodiments of the invention, Fig. 1 is a vertical section of an electrical slip coupling type of dynamometer; and, Figs. 2, 3 and 4 are diagrammatic sectional layouts of various forms of the invention, the views being taken primarily from above.

Similar reference characters indicate corresponding parts throughout the several views of the drawings.

In the American Institute of Electrical Engineers, Technical Paper No. 43–41, December, 1942, is discussed the arrangement of a power-recovery test system for aircraft engines. This consists primarily of a synchronous generator driven through a hydraulic slip coupling by the engine under test. The intention is to convert engine output into electrical energy, which energy is then supplied to the power mains of the engine testing plant. The slip coupling is to provide for power-recovery engine operation over a wide range of speeds above synchronism, while driving the synchronous machine which operates only at its one synchronous speed. The slip coupling described in said publication is of the hydraulic type and acts as a mere transmission, and not as a dynamometer. There is no locking of the driven shaft of the coupling for such purposes as will hereinafter be described.

The present invention functions not only as a transmission between the engine under test and the generator, but also as a selectively operable dynamometer which is available for obtaining torque measurements for brake horsepower test purposes both below and above synchronous speed. The invention also permits the use of the synchronous generator as a motor for driving the test engine for purposes of loosening up a "green" engine, making lubrication studies, and the like. It also permits of engine loading below or above synchronous speeds without testing for torque.

Referring now more particularly to Fig. 1, there is shown a slip coupling type of power-absorption dynamometer which is to be used, and this will first be described.

At numerals 1 and 3 are shown pedestals for the unit which is as a whole indexed D. This dynamometer D consists of a case 5 which, in several forms of the invention, swings in the pedestals 1 and 3 on bearings 7. As will be noted from Fig. 1 the case 5 includes hubs 22 from which hollow trunnions 4 extend outward through the bearings 7. Thus the case 5 along with its hubs 22 and trunnions 4, may swing in the pedestals 1 and 3. This swinging movement is limited, as will appear, by application of moment to a weighing scale 61 (Fig. 2).

At numeral 9 is the power input shaft to which the engine E to be tested is coupled. At its flanged end 11 this shaft is coupled to one enclosing head 13 of an eddy-current inductor drum 15. The other enclosing head 17 of the inductor drum is carried on a pilot bearing 19. The bearing 19 is located around the driven shaft 21, as is also a pilot bearing 23, which forms a support for the head 13. The bearing 25 allows free rotation of the input shaft 9 within the swinging case 5; and a bearing 27 allows free rotation of the output shaft 21 in the case 5. Inward extensions 66 from the hubs 22 form grooved or capillary water seals with cylindric portions 88 of the heads 13 and 17, the purpose of which is to provide protection against entry of water into any of the bearings. As will later appear, water circulates between the case 5 and the drum 15. On the inner ends of the cylindric portions 88 are internally grooved or capillary seals 10 around shaft 21. These seals are within bearings 19 and 23 respectively. They prevent escape of lubricant.

The outer race structures 12 of the bearings 7 are made rotary in the pedestals 1 and 3 respectively, being formed with gear teeth 14 with which are meshed pinions 24. The latter are carried on shafts 18 passing through the pedestals 1 and 3 respectively. At their other ends these shafts 18 carry square heads 20 for application from time to time of a wrench to cause angular displacement of the outer races 12. The purpose of this is from time to time to bring new parts of the bearings 7 into position so as to prevent spalling of any given part of the bearing. Since the case 5 rocks only through a small angle, bearings 7 (unlike ordinary ball bearings) do not rotate through 360°. Hence in the absence of an adjustment the lower parts of these bearings 7 would continuously support the weight, and as a result the continuous vibration of the machine would cause these lower parts to deteriorate by spalling. Devices of this nature are known as hand-operated, rotatable trunnion bearing sleeves and are commonly used in the dynamometer industry. In some constructions the outer races are continuously slowly rotated by a motor drive.

The driven shaft 21, within the drum 15 and heads 13 and 17, has keyed thereto a field spider 29 which carries exciter coils 31, suitably energized from an outside source by collector rings and lead-in wiring, the wiring passing through suitable channels (not shown) in the shaft 21. The details of the lead-in means are not shown, since the manner in which this is managed is known in the art.

When the field coils 31 are energized, flux fields interlink the members 15 and 29, so that 15 drives 29 electromagnetically with some slip, the electrical energy due to slip being transformed into heat in the material of the drum 15. This heat is abstracted by a spray of water which is introduced into the space between the case 5 and the drum 15. This water flows down to a sump 33 from which it is removed by suitable flexible tubing. For applicable water abstracting means, see my U. S. patent application for Dynamometer, Serial No. 491,101, filed June 17, 1943, eventuated as Patent 2,367,636, dated January 16, 1945. Similar water cooling features for a similar inductor drum are shown in my United States patent application, Serial No. 439,205, filed April 16, 1942, for Eddy-current coupling, eventuated as Patent 2,334,976, dated November 23, 1943. In this latter patent, however, no swinging case is shown. Suitable free-running water seals 35 are used between the heads 13 and 17 respectively and the case 5, also as described in the last-mentioned application. These seals 35 are of the centrifugal type which prevent most if not all leakage. The additional seals 66 prevent any small amount of water which may escape through seals 35 from entering any of the bearings 7, 19, 23, 25 or 27. The water is introduced onto the member 15 from a manifold 37 having a supply pipe 39 and inlet spray openings 41 for projecting a spray of water onto the drum 15.

From the above, it will be seen that there may be relative rotary motion between the drum 15 (driven by the shaft 9) and the spider 29 (coupled to the driven shaft 21). It is also clear that the casing 5 swings freely through a limited angle in the pedestals 1 and 3 and around both of the relatively rotary members 15 and 29. Thus the swinging casing 5 forms a plenum chamber for the water cooling spray and also the rocking means (under conditions to be described) for applying torque force to the dynamometer measuring scale 61, also to be described.

In Fig. 2 is shown one embodiment of the apparatus of Fig. 1 in a new power-recovery system. At E is shown the engine to be tested, in this case an airplane engine which rotates the drive shaft 9 and inductor drum 15. By means above described the drum 15, with slip, drives spider 29 and the driven shaft 21. The drum 15 and spider 29 rotate within the swinging or rocking housing 5 within which the water spray is maintained.

The shaft 21 is coupled to the rotor 43 of a synchronous generator indicated generally at G. The field member 45 of the synchronous generator is carried in a housing 47, which, in the present form of the invention, is mounted for rocking movement in bearings 49 in pedestals 51. Bearings 53 accommodate rotation of the shaft 21 within the housing 47.

From the above, it is clear that in Fig. 2, both the cases 5 and 47 are trunnion mounted, as distinguished from foot mounting in which no rocking is possible.

The rocking generator field housing 47 is provided with an arm 55, the end of which bears upon a scale 57 for evaluating torque force on the field housing.

The case 5 of the dynamometer D is also provided with a torque arm 59 bearing upon a scale 61 for evaluating torque force on the casing.

Between the dynamometer unit D and the generator G, the driven shaft 21 is provided with a clutch C having a splined element 63. A second element 65 is carried on and with an extension 66 from the rocking case 5. A clutch-operating lever is shown at 67, and it will be understood that this may be manually, hydraulically, pneumatically or electrically operated, as desired. It will be understood that any of various types of clutches may be used at this point, the general principle being that a locked coupling is to be obtained between the driven shaft 21 and the case 5, which coupling may be opened or closed either when the shaft 21 is rotating or when it is stationary. The clutch C when closed stalls the generator G.

Various operations of the Fig. 2 form of the invention are as follows:

For obtaining engine horsepower without power recovery and at any speed, the field 31 of rotor 29 is electrically deenergized. The engine E is started. This idly rotates the inductor drum 15. The clutch, which will hereinafter be indexed C, may be then closed from the open position shown, which closure in effect makes a single rocking unit of the drum 29, shaft 21, clutch elements 63, 65 and case 5. The engine E is then loaded at the desired speed and the field member 29 is energized, so as to effect an electromagnetic slip between drums 29 and 15. This generates heat in the drum 15 which is carried off by the water between the outside of the drum 15 and the case 5. The result is that torque due to energy conversion is transmitted from the engine E and drum 15 to the spider 29 and the coupled case 5. Since the latter is trunnion mounted, the arm 59 applies a force to the scale 61. In addition, any torque due to hydraulic action of the water on case 5 which spins off from the outside of the drum 15 registers additional force on the scale 61. Hence, the speed of drum 15 being known, by means of one reading on the scale 61, all the data on force is obtained for making a complete and accurate calculation of the engine power as absorbed in both electrical and water losses. Under these conditions scale 57 is not used. It will be apparent that, if the dynamometer D is designed large enough, dynamometer readings can be taken throughout the whole power range of the engine at any speed above or below the synchronous speed of G, since G is, under the stated clutch locked conditions, not operating at all.

Under the above conditions and assuming a 63-inch (plus) arm 59, the calculation for obtaining engine horsepower is obtained by multiplying the R. P. M. of shaft 9 by the scale reading in pounds on scale 61, all divided by 1000. This calculation includes all of the horsepower absorbed in electrical slip and water loss.

If the dynamometer D is designed smaller, so as to absorb all energy at engine speeds only below the synchronous speed of the generator, then horsepower ratings above synchronous generator speed are obtained as follows:

The field 31 of member 29 is first deenergized, and the clutch C is opened, as indicated in Fig. 2. Thus no energy flows from the engine E through the dynamometer D nor is it transmitted to shaft 21. The synchronous generator G may be started at full voltage being connected to the line in the conventional synchronous motorizing manner, assuming that it has the necessary amortisseur windings for the purpose. As is known, a synchronous machine such as G may function as a motor or generator, depending upon whether mechanical energy is being abstracted from it or delivered to it. The generator G having attained synchronous speed, the engine E may, by energizing 31, be cranked for starting and/or running-in purposes at lower than synchronous speed. Finally, the engine may be fired, and brought up to a speed the same as, or above this synchronous speed. Then assuming the field 31 of member 29 to be energized and the clutch C open, we have a slip coupling between members 15 and 29 and, since the clutch C is open, the rotor 43 of the generator may be operated at its synchronous speed, which causes the generator G to supply current to the lines connected therewith. If the engine E is rotating above the synchronous speed of G, the stated slip occurs between 15 and 29 and varies as the engine speed changes. Since the stator 45 of the generator G is cradled in a rocking mount, as described, its arm 55 presses upon the scale 57 and from readings thus attained in addition to scale readings at 61, engine horsepower calculations can be made for engine speeds above synchronism.

With the form of the invention shown in Fig. 2 assuming the clutch C to be open and the shaft 21 to be operating at synchronous speed (engine E operating above synchronous speed), the factors to be summed up for obtaining engine horsepower are as follows, assuming 63 inches (plus) for the effective radii of arms 55 and 59:

(a) Horsepower due to electrical slip loss between the rotors 15 and 29 equals the difference between the R. P. M. of shafts 9 and 21 multiplied by the readings in pounds on scale 57, all divided by 1000.

(b) The horsepower delivered by alternator G equals the R. P. M. of shaft 21 multiplied by the scale readings in pounds on scale 57, all divided by 1000.

(c) The horsepower due to water loss between the rotor 15 and the case 5 is equal to the R. P. M. of shaft 9, multiplied by the reading in pounds on scale 61, all divided by 1000.

To obtain total horsepower the results of the above three terms (a), (b) and (c) are added to give the total horsepower being delivered by the engine E.

It will be understood that, when, as above first described, the dynamometer D is made large enough to obtain all torque readings necessary over the whole range of engine speeds, both below and above the synchronous speed of generator G (operation with clutch C locked), the generator G has no function during horsepower measuring tests. It functions to absorb power from the engine under other circumstances, one of which has been described (clutch C open).

A further use is as follows (Fig. 2).

With the clutch C open and the case 5 held against rotation, the generator G may, as above indicated, be operated as a synchronous motor. When the field 29 is energized, the motorizing generator then drives the engine E through the slip coupling existing between drums 29 and 15. This is a useful procedure for making friction or lubrication tests, for turning over a "green" engine, or for other purposes. The reactions registered on the scales 57 and 61 and the various relative speeds are again used for horsepower computations, as above made clear in connection with open clutch operation.

If the dynamometer D is made large enough to absorb all energy at all speeds of the engine E, both above and below synchronous speed, as above described, and if it be not desired to measure energy for turning the engine E from the generator G, then it is not necessary to mount the case 47 of the generator in a rocking mount, that is, the bearings 49 may be eliminated along with the arms 55 and scale 57. This involves foot mounting the generator case 47, as indicated at 6 in Fig. 3. Any horsepower tests with the engine E driving are then made with the clutch C closed, as shown in Fig. 3, thus causing all torque force data to appear on scale 61, as in the case with Fig. 2 when the clutch C was assumed to be shut. It is of course to be understood that in Fig. 3 clutch C may be opened when torque tests through the case 5 are not necessary. This allows for driving the generator which will produce current for power recovery. Such driving may be desired in running in an engine. In Fig. 3, as in Fig. 2, the clutch C when closed stalls the generator G.

In Fig. 4 the generator G is foot mounted as at 6 and the dynamometer coupling D is cradled but neither the clutch C nor scale 61 is used. Instead, a removable arm 69 is temporarily clamped to a hub 2 on the shaft 21 and allowed to act upon a scale 71. In place of the scale 61, an arm 73 is caused to reach from the casing 5 to the arm 69. This impresses moment from the casing 5 to said arm 69, in addition to the moment which arm 69 receives from the slip coupling between 15 and 29. The clutch C is not used, or, if in place, it is released. In this Fig. 4 case, the engine horsepower is equal to the R. P. M. of shaft 9 multiplied by the reading in pounds on scale 71, all divided by 1000, assuming 63-inch (plus) effective radius for arm 69. This calculation takes into account the electrical slip loss and the water loss, the water loss being taken care of by transmission of torque through the extension 73. When power recovery is desired, the arm 69 is removed and the case 5 is blocked against swinging, for example by allowing arm

73 to engage a stationary object. Under these conditions torque measurements are not possible; but substantial power recovery may be had by the generator action. Such driving again may be desired in running in an engine.

The electrical slip coupling herein described has per se advantages over hydraulic couplings which will not develop sufficient torque below synchronous speeds of an alternator to act properly as dynamometers or with a locked output shaft. Furthermore, hydraulic couplings are not reversible in direction, so that clockwise or counterclockwise rotation of engines can be accommodated on one machine.

The present construction also eliminates the complex water-regulating systems that are required to maintain pressure for hydraulic couplings if used as dynamometers.

In designing the apparatus the following should be noted in setting the synchronous speed at which the generator operates. When synchronous speeds are selected that are very low, that is, those that lie in the range of very low engine power, then the alternator cannot produce a large enough proportion of its true capacity at synchronous speed and the system becomes too inefficient. It is thus better to select a higher synchronous speed. Since there is a need for testing engines at speeds lower than the above mentioned desired and relatively high synchronous speed, the schemes herein outlined for obtaining capacity below this synchronous speed are very useful. That is to say, the invention provides a means which will enable testing of the engine below synchronous speed of the alternator, besides above this speed. It also allows for stalling of the synchronous generator so that engines can be loaded at any speeds including those above and below the synchronous speed of the generator.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A combined dynamometer and slip coupling comprising a driving shaft, a driven shaft, one of said shafts carrying a field member and the other an inductor member electro-magnetically cooperating with the field member, said inductor member surrounding said field member, a casing surrounding said inductor member and movable relatively thereto, means for circulating a cooling medium through said casing, and around the inductor member and means for registering torque due to slip between the inductor and field members comprising an operable clutch connecting the field member and the casing and measuring means associated with said casing for determining force due to moments applied to the casing.

2. A combined dynamometer and a slip coupling comprising a driving shaft, a driven shaft, one of such shafts carrying a field member and the other an inductor member electro-magnetically cooperating with the field member, said inductor member surrounding said field member, a casing surrounding said inductor member, a mount for cradling said casing with respect to said shafts, means for circulating a cooling medium between said casing and the inductor member for absorbing heat from the latter, openable clutch means between the driven shaft and said cradled case, and scale means responsive to movement of the case to register full torque force when the clutch is closed.

3. A combined dynamometer and slip coupling comprising a driving shaft, a driven shaft, one of such shafts carrying a field member and the other an inductor member electro-magnetically cooperating with the field member, said inductor member surrounding said field member, a casing surrounding said inductor member, a mount for said casing permitting the casing to rock relative to the shafts, openable clutch means for connecting the driven shaft and the casing, and weighing means connected to said casing and responsive to torque applied thereto from the driven shaft by said clutch when closed.

4. A combined dynamometer and slip coupling comprising a driving shaft, a driven shaft, one of such shafts carrying a field member and the other an inductor member electro-magnetically cooperating with the field member to absorb energy, said inductor member comprising a liquid-sealed drum surrounding said field member, a liquid-sealed casing surrounding said inductor member and movable relatively thereto, cooling liquid being located between the drum and the casing, a connection between the driven shaft and the casing, a weighing scale, and means for applying force to said scale due to moment from said casing and moment from said driven member, the total moment being that due to rotary action of the liquid between said casing and said inductor member and also due to electrical torque between the inductor and field members at least some of said moment being delivered through said connection to the casing.

5. Engine test apparatus comprising a synchronous generator, a slip coupling capable of absorbing power having a driving element and a relatively rotary driven element, said driving element being coupled to the engine and said driven element being coupled to the synchronous generator, a casing surrounding said driving and driven elements of the slip coupling and containing fluid, a mount for said casing whereby it may rock, a measuring scale and means coupling said casing and the scale to register force on the scale due to torque from the casing.

MARTIN P. WINTHER.